United States Patent
Wong

(10) Patent No.: US 8,789,821 B2
(45) Date of Patent: Jul. 29, 2014

(54) TAB WELDING BRACKET

(75) Inventor: Harry Wong, South Pasadena, CA (US)

(73) Assignee: Valtra, Inc., Pico Rivera, CA (US)

( * ) Notice: Subject to any disclaimer, the term of this patent is extended or adjusted under 35 U.S.C. 154(b) by 331 days.

(21) Appl. No.: 12/782,091

(22) Filed: May 18, 2010

(65) Prior Publication Data

US 2010/0301533 A1   Dec. 2, 2010

(30) Foreign Application Priority Data

Jun. 1, 2009 (CN) .......................... 2009 1 0052313

(51) Int. Cl.
*B25B 11/00* (2006.01)
*B23K 37/053* (2006.01)
*B23K 37/04* (2006.01)

(52) U.S. Cl.
CPC ........... *B23K 37/0435* (2013.01); *B23K 37/053* (2013.01); *B23K 2201/06* (2013.01)
USPC ................. 269/8; 269/97; 269/37; 248/206.5

(58) Field of Classification Search
USPC .............. 269/8, 95, 97, 37, 45, 71; 248/206.5
See application file for complete search history.

(56) References Cited

U.S. PATENT DOCUMENTS

| | | | | |
|---|---|---|---|---|
| 891,121 A | * | 6/1908 | Wichers | 269/108 |
| 1,676,124 A | * | 7/1928 | Wilkie | 248/231.61 |
| 3,741,517 A | * | 6/1973 | Pogonowski | 251/5 |
| 4,693,473 A | * | 9/1987 | Miller | 294/19.2 |
| 4,707,032 A | * | 11/1987 | Chang | 297/411.29 |
| 4,877,228 A | * | 10/1989 | Ripert | 269/156 |
| 5,201,501 A | * | 4/1993 | Fassler | 269/32 |
| 5,971,379 A | * | 10/1999 | Leon, Jr. | 269/8 |
| 6,149,181 A | * | 11/2000 | Biederman | 280/491.1 |
| 6,279,885 B1 | * | 8/2001 | Leon, Jr. | 269/8 |
| 6,427,993 B1 | * | 8/2002 | Prochac | 269/37 |
| D480,095 S | * | 9/2003 | Leon, Jr. | D15/144 |
| 7,419,148 B1 | * | 9/2008 | Jones et al. | 269/42 |
| 7,758,003 B2 | * | 7/2010 | Pourtier et al. | 248/300 |
| 7,775,535 B2 | * | 8/2010 | Bluff et al. | 280/124.116 |
| 7,959,140 B2 | * | 6/2011 | Wong et al. | 269/8 |
| 2007/0210230 A1 | * | 9/2007 | Pourtier et al. | 248/342 |
| 2007/0245525 A1 | * | 10/2007 | Hoffman | 16/367 |

* cited by examiner

*Primary Examiner* — Brent W Herring

(74) *Attorney, Agent, or Firm* — Jen-Feng Lee, Esq.

(57) ABSTRACT

Present invention provides a handy tool that can be used to facilitate welding job, where (second) work objects can be held on by the holding surfaces of the first positioning frame of the welding bracket; the first positioning frame is used to hold on to another (first) work piece between the generally v-shaped swinging foot pieces on the v-frame; the two swinging foot pieces can pivot on respective axle, allowing for adjustment to different size/diameter of first work piece, and the bolt and butterfly nut structure allows adjustment to be made between first positioning piece and the v-frame, for purpose of adapting to welding object of different thickness held on by the holding surfaces on the positioning frame.

4 Claims, 3 Drawing Sheets

TAB WELDING BRACKET

FOREIGN PRIORITY CLAIM

The present invention claims the foreign priority of a Chinese application, number 200910052313.0, having priority date of Jun. 1, 2009.

FIELD AND BACKGROUND OF THE INVENTION

The present invention relates to a device for specialized use and assistance for welders when work objects need to be held and stabilized during welding.

Particularly, present invention is suitable for holding small- to medium-sized work pieces (referred to as second object) and stabilize these pieces, for welding on to a bigger work piece (referred to as first object.)

Traditionally, to provide the needed holding and stabilizing, clamping type tools are usually used where a welding worker holds the needed clamping tool that holds the object (second object) and then welds the second object to the first object.

As can be imagined, the welder has to contend with the weight of the second object, the stability of his (her) hand when holding on to the second object, leaving only one hand to work on the actual operation of the welding. The precision of the welded work sometimes is less than satisfactory.

SUMMARY OF THE INVENTION

Present invention provides a handy tool that allows easy holding on to second object, especially if the work objects have magnetic workability, using the bracket of present invent, where the v-frame portion holds on to the first object, allowing welding workers to operate the actual welding with both hands.

To achieve the desired goal, a first positioning frame is made to be in a slidable engagement relationship to a v-frame. The v-frame is used to hold on to a first object, by the v-shaped swinging foot pieces formed on said v-frame. The second work object, being held by the holding surface of the first positioning piece, can then be properly positioned, with adjustment made by loosening/tightening the bolt with butterfly nut, so that the second work object is aligned to the desired place, usually the center line of the first object, such as a pipe.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 1:
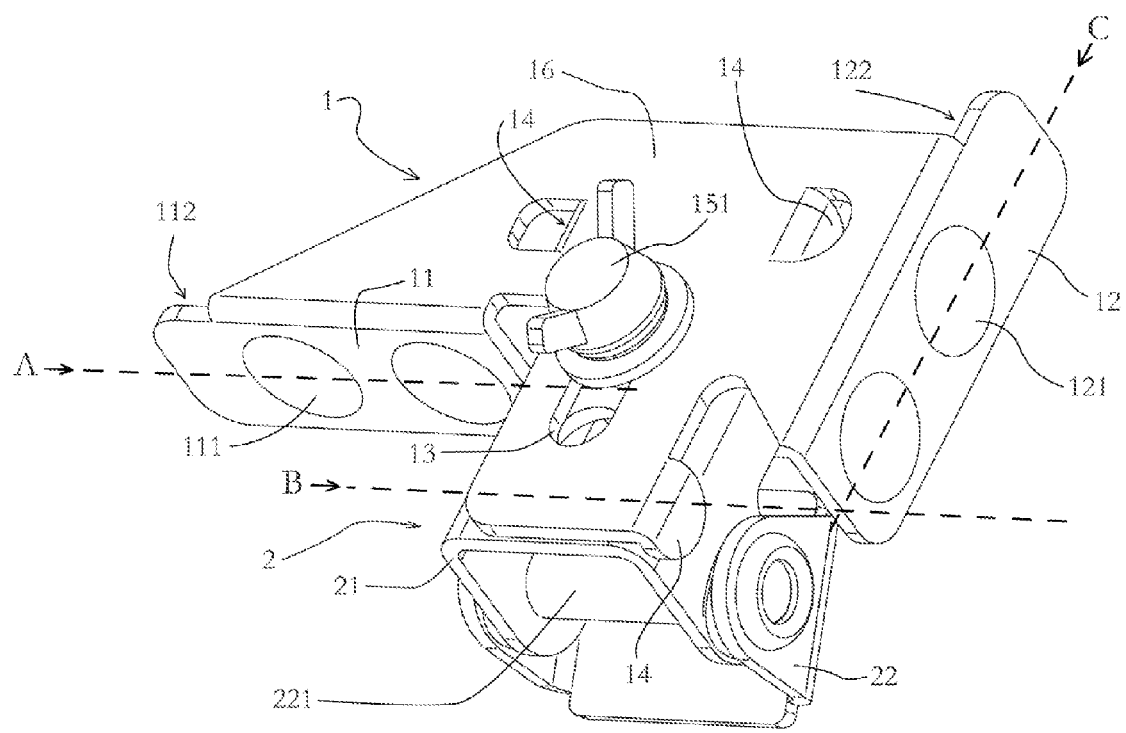
FIG. 1 shows the overall structure of present tab welding bracket, looking towards the top surface of the positioning frame, with the butterfly nut shown.
Figure 2:
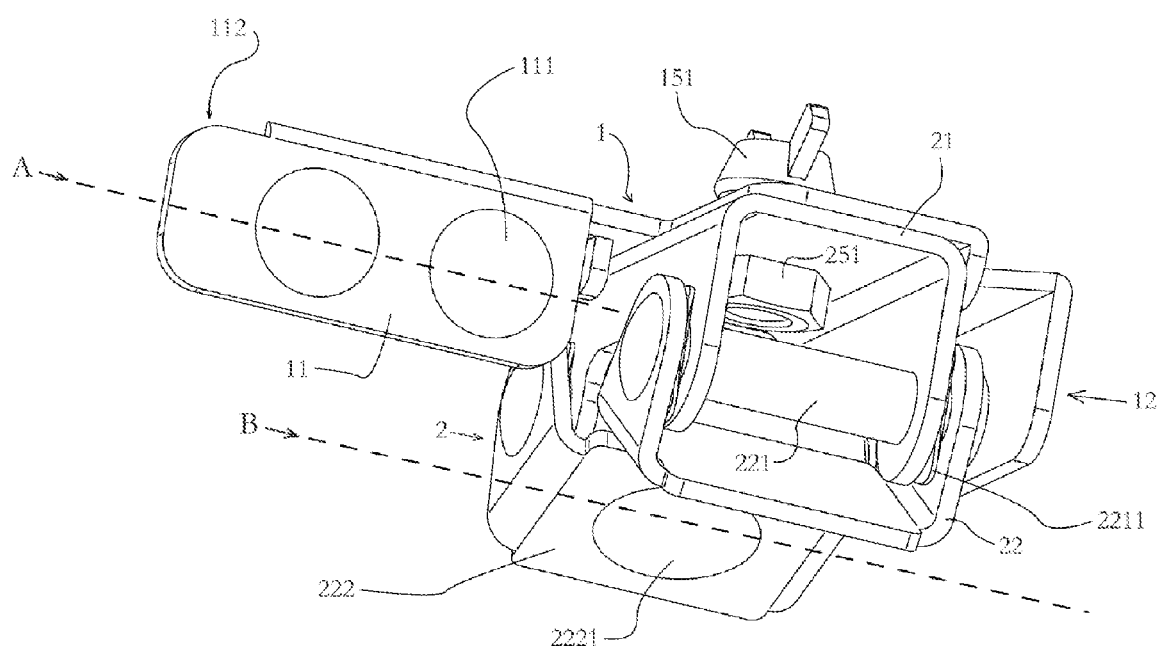
FIG. 2 shows the overall structure of present tab welding bracket, looking towards the swinging feet portion of the v-frame, with the dotted line B representing the axle direction of a first work piece, such as a pipe.

As shown in FIGS. 1 & 2, the tab welding bracket of present application primarily is made up of a positioning frame 1 and a v-frame 2. Positioning frame 1 has a generally flat base plate 16; two holding surfaces 11 & 12 are formed on the two ends of said base plate 16 where they are folded in a 90-degree fashion to the surface of base plate 16; in addition, holding surfaces 11 & 12 are also in a 90-degree orientation as between holding surfaces 11 & 12. The dotted lines of A and C show the length-wise direction, respectively for holding surface 11 & 12, when (second) work object is attached directly to the two surfaces 11 & 12. Magnetic pieces 111 and 121 are built into the surface of holding surfaces 11 & 12, so that (second) work objects with magnetic workability will be held to the surfaces 11 & 12 directly.

As an alternative feature, the two holding surfaces 11 & 12 formed on the two ends of said base plate 16 of positioning frame 1 may be oriented at an angle other than 90-degree, such as 30, 45 or 60 degrees, to facilitate greater freedom of welding on different objects at varied angles.

Tow dotted lines, A and C respectively, are shown in FIG. 1, depicting the orientations of work pieces/objects, referred to as "second object" or "second work object" for purpose of describing the structure of present application, that will be held by the two holding surfaces 11 & 12, as provide in present application.

V-frame 2 contains a base 21 and two swinging foot pieces 22. Said two swinging foot pieces 22 each pivots around its respective swinging axle 221, so that an angle can be formed between the two foot surfaces 222. The angle is generally v-shaped, thus the name of v-frame, allowing said two foot surfaces 222 to be attached onto an object, referred to as "first object" or "first work object" for purpose of describing present application, such as a pipe, whose lengthwise direction would be along the dotted line of B, as shown in FIG. 2.

Two saddle spring pieces 2211 are used on each of the swing axel 221, as shown on FIGS. 1 & 2, so that some resisting damping effect is provided to the pivoting action of each swinging foot piece 22, making it easy for users to set the desired angle of the foot surface 222.

As can be imagined, the two foot surfaces 222 can be made to align to a single planer surface, when the swinging foot pieces 22 are set to such angle/position, as needed, in the case where the contact surface of a first object is a flat surface.

On the foot surface 222, a foot magnet 2221 is built into it, so that the two swinging foot pieces 22 can be used to hold on to magnetic-compatible first work piece for purpose of tab welding.

When welding job is in progress, welders can use v-frame 2 (its two swinging foot pieces 22, actually) to hold on or attach to a first work object, such as a section of a pipe; the holding surfaces 11 & 12 of positioning frame 1 are used to hold on to second work object, in a desired orientation as set by workers, using the disclosed and claimed features in this application.

A slot 13 is made on positioning frame 1, so that a butterfly nut 151 with a bolt 251 is placed through said slot 13 to v-frame 2, allowing some degree of sliding adjustment between positioning frame 1 and v-frame 2. Said needed sliding adjustment is achieved by a plurality of guiding ear pieces 14 made from the base plate 16 of positioning frame 1.

Figure 3A:
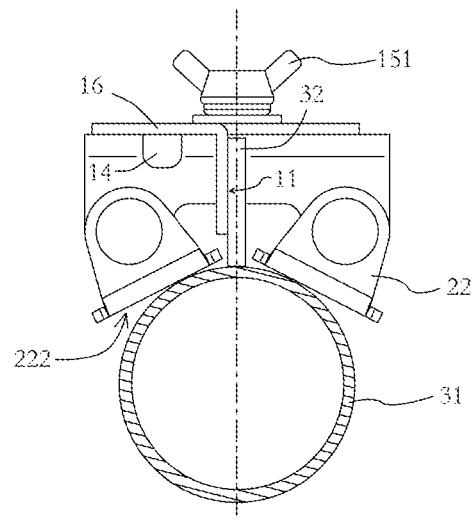
FIGS. 3a and 3b show the application of present tab welding bracket, when the holding surface is holding second work object of different thickness; the slot/nut/bolt adjustment allows the second work object to be aligned to the center line, dotted line, of the first object, such as a pipe.
Figure 3B:
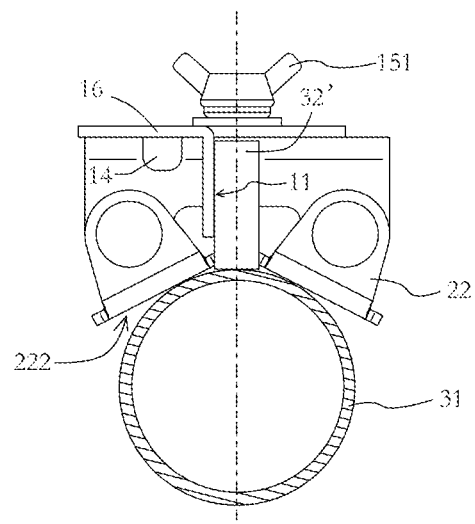

FIGS. 3a and 3b show the adjustments made, having the slot 13 structure disclosed herein, so that the needed welding job on second work object(s) of different thickness can be done accordingly. By such slot/nut/bolt (13/151/251) arrangement, present invention enables the alignment of a second work piece (such as object 32 or 32' attached to holding surface 11, as shown in FIGS. 3a and 3b) of different thickness to be always positioned along the center line of a first work piece 31, which is shown to be the cross section profile of a tube/pipe, with the center line shown in dotted fashion.

Clamping extender 112 and 122 are made to the outer ends of said holding surfaces 11 and 12, so that additional clamping devices can be used on present invention when something other than magnetic adhesion is needed to hold/align work pieces on to said holding surfaces 11 and 12. This feature would provide the holding capacity for welding non-magnetic metal pieces to work piece(s) attached to the v-frame 2.

What is claimed is:

1. A tab welding bracket, comprising:
a v-frame, further comprising a base and two swinging foot pieces affixed to respective swing axles at two ends of said base whereby said two swinging foot pieces generally form a v-angle as defined by two foot surfaces of said swinging foot pieces; and
a positioning frame for holding on to work pieces, said positioning frame further having guide ear pieces for slidably engaging to said v-frame and for limiting the relative travel between said positioning frame and said v-frame, wherein a sliding and limiting-travel arrangement between said positioning frame and v-frame are provided by a slot on said positioning frame, a butterfly nut and bolt, so that users can fix the position of two holding surfaces, according to the thickness of the work piece being attached to said two holding surfaces.

2. A tab welding bracket, comprising:
a v-frame, further comprising a base and two swinging foot pieces affixed to respective swing axles at two ends of said base whereby said two swinging foot pieces generally form a v-angle as defined by two foot surfaces of said swinging foot pieces; and
a positioning frame for holding on to work pieces, said positioning frame further having guide ear pieces for slidably engaging to said v-frame and for limiting the relative travel between said positioning frame and said v-frame, and
further having clamping extenders made to the outer ends of two holding surfaces, so that additional clamping devices can be used when non-magnetic adhesion is needed to hold/align work pieces.

3. A tab welding bracket, comprising:
a v-frame, further comprising a base and two swinging foot pieces affixed to respective swing axles at two ends of said base whereby said two swinging foot pieces generally form a v-angle as defined by two foot surfaces of said swinging foot pieces; and
a positioning frame for holding on to work pieces, said positioning frame further having guide ear pieces for slidably engaging to said v-frame and for limiting the relative travel between said positioning frame and said v-frame, and wherein each of two holding surfaces contains one or more magnetic pieces for purpose of holding on or securing to work objects that have magnetic workability.

4. A tab welding bracket, comprising:
a v-frame, further comprising a base and two swinging foot pieces affixed to respective swing axles at two ends of said base whereby said two swinging foot pieces generally form a v-angle as defined by two foot surfaces of said swinging foot pieces; and
a positioning frame for holding on to work pieces, said positioning frame further having guide ear pieces for slidably engaging to said v-frame and for limiting the relative travel between said positioning frame and said v-frame, and wherein each of the said foot surfaces of said swinging foot pieces contains one or more foot magnets for purpose of holding on or securing to work objects that have magnetic workability.

* * * * *